(12) United States Patent
Khadrbeik et al.

(10) Patent No.: US 9,341,026 B2
(45) Date of Patent: May 17, 2016

(54) APPARATUS AND METHOD FOR MODIFYING THE SIDEWALLS OF A BOREHOLE

(75) Inventors: Mohammad Ali Taghipour Khadrbeik, Trondheim (NO); Inge Manfred Carlsen, Trondheim (NO)

(73) Assignee: SINVENT AS, Trondheim (NO)

( * ) Notice: Subject to any disclaimer, the term of this patent is extended or adjusted under 35 U.S.C. 154(b) by 1139 days.

(21) Appl. No.: 13/062,780

(22) PCT Filed: Sep. 8, 2009

(86) PCT No.: PCT/NO2009/000315
§ 371 (c)(1),
(2), (4) Date: Jul. 18, 2011

(87) PCT Pub. No.: WO2010/027274
PCT Pub. Date: Mar. 11, 2010

(65) Prior Publication Data
US 2011/0259641 A1    Oct. 27, 2011

(30) Foreign Application Priority Data

Sep. 8, 2008 (NO) .................................... 20083860
Mar. 18, 2009 (NO) .................................... 20091149

(51) Int. Cl.
*E21B 7/00* (2006.01)
*E21B 11/00* (2006.01)
(Continued)

(52) U.S. Cl.
CPC ............. *E21B 10/26* (2013.01); *E21B 7/001* (2013.01); *E21B 7/005* (2013.01); *E21B 7/04* (2013.01); *E21B 7/068* (2013.01); *E21B 10/66* (2013.01)

(58) Field of Classification Search
CPC ......... E21B 7/001; E21B 7/005; E21B 10/44; E21B 17/22; E21B 10/66; E21B 10/26; E21B 7/068; E21B 7/04; E21B 10/34; E21B 10/32

USPC .................. 175/57, 91, 96, 263, 266
See application file for complete search history.

(56) References Cited

U.S. PATENT DOCUMENTS 1,810,201 A * 6/1931 Campbell ..................... 175/266
1,834,337 A * 12/1931 Crum ........................... 175/271
(Continued)

FOREIGN PATENT DOCUMENTS

EP    0313413 A1    4/1989
EP    1955674 A2    8/2008
(Continued)

OTHER PUBLICATIONS

PCT/NO2009/000315 International Search Report and Written Opinion, Nov. 23, 2009 (16 p.).
(Continued)

*Primary Examiner* — Kenneth L Thompson
*Assistant Examiner* — Michael Wills, III
(74) *Attorney, Agent, or Firm* — Conley Rose, P.C.

(57) ABSTRACT

The present invention concerns an apparatus for modifying sidewalls of a borehole. The apparatus includes a longitudinal housing adapted to fit inside the borehole. The housing includes a first end portion, a second end portion, and a side portion between said end portions, adapted to face the sidewalls of the borehole. Means are provides on the side of the housing for removing material from said borehole sidewall. The housing is adapted to be rotated with a controlled rotational speed in relation to said borehole sidewalls and to be fed in a controlled rate of longitudinal motion in relation to said borehole. Furthermore, the invention relates to a method for making a borehole with internal, helical grooves.

14 Claims, 7 Drawing Sheets

(51) Int. Cl.
 *E21B 10/26* (2006.01)
 *E21B 10/66* (2006.01)
 *E21B 7/04* (2006.01)
 *E21B 7/06* (2006.01)

(56) References Cited

U.S. PATENT DOCUMENTS

| | | | |
|---|---|---|---|
| 2,654,575 A * | 10/1953 | Kammerer | 175/266 |
| 3,085,639 A | 4/1963 | Fitch | |
| 3,360,960 A | 1/1968 | Massey | |
| 3,422,629 A * | 1/1969 | Watts | 405/238 |
| 3,425,500 A | 2/1969 | Fuchs | |
| 4,629,010 A | 12/1986 | Sourice | |
| 4,862,974 A | 9/1989 | Warren et al. | |
| 5,040,620 A | 8/1991 | Nunley | |
| 7,314,099 B2 * | 1/2008 | Dewey et al. | 175/57 |
| 7,341,117 B2 * | 3/2008 | Wylie et al. | 175/72 |
| 7,591,329 B2 * | 9/2009 | Perpezat et al. | 175/384 |
| 7,700,910 B2 * | 4/2010 | Samworth | 250/269.1 |
| 2005/0039952 A1 * | 2/2005 | Hill et al. | 175/57 |
| 2007/0023207 A1 | 2/2007 | Perpezat et al. | |
| 2008/0093125 A1 | 4/2008 | Potter et al. | |
| 2008/0251294 A1 * | 10/2008 | Minshull | 175/57 |
| 2009/0301779 A1 * | 12/2009 | Bick | 175/45 |
| 2010/0032207 A1 * | 2/2010 | Potter et al. | 175/11 |

FOREIGN PATENT DOCUMENTS

| | | |
|---|---|---|
| GB | 2164371 A | 3/1986 |
| WO | 9913194 A1 | 3/1999 |
| WO | 0111179 A1 | 2/2001 |

OTHER PUBLICATIONS

Search Report for Norwegian Application No. 20091149, Oct. 15, 2009 (1 p.).

* cited by examiner

APPARATUS AND METHOD FOR MODIFYING THE SIDEWALLS OF A BOREHOLE

CROSS-REFERENCE TO RELATED APPLICATIONS

This application is a 35 U.S.C. §371 national stage application of PCT/NO2009/000315 filed Sep. 8, 2009, which claims the benefit of Norwegian Application No. 20083860 filed Sep. 8, 2008 and Norwegian Application No. 20091149 filed Mar. 18, 2009, all of which are incorporated herein by reference in their entireties for all purposes.

STATEMENT REGARDING FEDERALLY SPONSORED RESEARCH OR DEVELOPMENT

Not applicable.

BACKGROUND

The present invention relates to modification of borehole sidewalls, in particular in connection with drilling of long boreholes. The invention is particularly adapted for extended reach drilling, ERD of wells such as offshore oil wells. Especially, the invention concerns an apparatus and method making a spiral shaped rifle inside a wellbore. The modified borehole is not a circular borehole with a uniform diameter along the length of the hole, but rather a hole with a non circular cross section, or a hole with varying diameter along the length. The apparatus of the invention may be used for milling the sidewalls of an all ready drilled hole, or may form a part of a unit providing simultaneous milling and drilling.

A solution for creating of non-circular boreholes in rocks for use with geothermal heat pump applications, and for increasing wellbore support in applications such as horizontal oil and gas drilling, is shown in US patent application 2008/0093125. The system uses a non contacting drilling system which in one embodiment uses a supersonic flame jet drilling system with a movable nozzle that swings between pivot points.

U.S. Pat. No. 4,629,010 shows a process and device for sinking wells. The device includes a pair of rotary digging heads with horizontal axes mounted on supports for movement of such axes towards and away from each other between a central position close to the axis of a well and a peripheral position adjoining the wall of the well being formed.

In for instance oil well drilling is well construction is an important cost driver in oil and gas field development, and extended reach drilling, ERD, is a key challenge. These types of drilling include extended reach far out from infrastructure and multiple targets, and may involve slim hole infill drilling, through tubing rotary drilling (TTRD), coil tubing drilling (CTD) and casing while drilling (CWD).

Extended reach drilling (ERD) is limited due to drill string friction causing excess drag and torque. This again may lead to drill string buckling and twist off.

Furthermore, increased pressure loss along the drill string may cause excessive pressure to the formation equivalent circulating density (ECD). This may again lead to borehole instability and lost circulation, poor well cleaning and stuck drill string. Drill string/borehole wall contact may also cause mud cake damage. A rotating drill string whirling in a borehole may cause damage to a mud cake continuously, further resulting in mud filtration loss and invasion zone around the borehole. With the present invention, this contact is reduced, and this causes less mud cake damage, less filtration losses and less wellbore instability. The contact can be reduced as much as 75% while a buckling limit of a drill string is maintained. Increased mud invasion may lead to borehole instability, well collapse and formation damage in a hydrocarbon reservoir. The present invention may maintain the same borehole clearance and thereby the same buckling capacity of a drill string in the borehole. Less invasion zone in a reservoir leads to reduced skin effect, improved production rate and higher recovery factor.

Fluid loss of the drilling mud is one of the main factors that results in borehole instability in formations. Maintaining the mud cake will decreases the rate of fluid loss. Preventing mud cake damage has a big impact in reducing the volume of fluid loss. Therefore, the present invention reducing the wall contact between a bore hole wall and eg. a drill string, will have a big impact to reduce the borehole instability.

Reduced borehole instability leads to less drilling time and increased operational safety, which are the main challenges issues in the drilling industry.

With a borehole with modified sidewalls according to the invention, it is proposed to increase the reach of wells by reducing the borehole wall friction by reducing wall contact, reducing the pressure loss along the drill string (ECD) by increasing an annulus area, increasing borehole stability by reducing wall contact of eg. a drill string, reducing differential sticking of drill string in open hole section, improving hole cleaning due to rotational flow regime in annulus, and reducing surface torque by eliminating drill bit reactive torque. Reducing the circulation pressure loss in an annulus reduces the pressure on the formation and thereby the risk of formation fracture. The total pressure inserted to the formation is equivalent to the hydrostatic pressure of circulating mud with the equivalent density in the annulus, ECD, is one of the main limiting factors in extended long boreholes. With the present invention, the ECD can be reduced, and thereby, the borehole length can be increased.

Reducing drill string/wall contact in borehole may again lead to less mud filtration loss and less borehole instability. Time is a key factor on volume of filtration loss.

Friction factor is an empirical parameter, affected by different variables: Sliding velocity, temperature, vibration, surface quality, contact area and extent of contamination. The friction laws for lubricated surfaces are considerably different than for dry surfaces. In lubricated surfaces the frictional resistance is almost independent of the specific load.

Increasing flowing area leads to less pressure loss (ECD) in the annulus.

$$\Delta P_{annulus} = \frac{48\mu_{pl} \cdot L \cdot \overline{v}}{(d_h - d_{Dp})^2} + \frac{6L\tau_o}{d_h - d_{Dp}}$$

$$ECD = \rho_m + \frac{\Delta P_{annu} + \Delta P_{acceleration} + \Delta P_{cuttings}}{gh}$$

Initial calculation models suggest 300% extended reach and 88% reduction in pressure loss per unit length. Additional benefits may include less drilling problems (less NPDT), reaching new targets and environmental benefits. This also results in saving costs.

Creating spiral grooves around a main borehole improves the flow regime with respect to drill cuttings transport in an annulus.

Lateral fluid movement in the spiral grooves and rotational flow regime will improve drill cuttings transportation compared to a circular annulus. In addition, more clearance below a drill string increases fluid velocity on a lower side of the borehole. Higher fluid velocity in this section is a key issue to increase cuttings transport reduce particle deposition.

Typical flow simulation with equivalent conditions show that the returning mudflow regime in a rifeled well annulus will be different compared to conventional annuluses and hole cleaning in ERD wells will be improved.

Higher fluid velocity below the drillpipe in the horizontal section leads to improved well cleaning and less settled cuttings. Better borehole cleaning will reduce the settled cuttings and excess drag and torque. Using larger diameter drillpipe for increased mechanical properties is also an option in some cases to extend the drilling reach.

A study of pressure loss in the different cases and comparing the conventional and a modified drilling system shows that the borehole cleaning is much better in modified wells.

BRIEF SUMMARY OF THE DISCLOSURE

The present invention concerns an apparatus for modifying the sidewalls of a borehole. The apparatus may be a bottom hole assembly, BHA. The produced borehole will not be a circular borehole with a uniform diameter along the length of the hole, but rather a hole with a non circular cross section, or a hole with varying diameter along the length. The cross section may in an embodiment include a multi profile well pattern where the profile will have several different profiles along the length of the hole or section, or may in a further embodiment be a multi spiral well pattern having several grooves along a main circular borehole. The borehole may in an even further embodiment have several diameters or an elliptic profile.

Furthermore, the present invention concerns a method for drilling the above mentioned borehole. Typically the borehole will have a helical or spiral shaped internal recess where the cross section vary along the length of the borehole, if the cross section is fixed to a reference axis along the length of the borehole, ie. not is turned along with the helical recess.

As explained above, borehole cross sections may have at least one of a multi profile well pattern with several different recesses, a multi spiral well pattern having several recesses or grooves along a main circular borehole, a multi diameter borehole or a combination of the various borehole shapes mentioned above.

In a further aspect, the invention provides a borehole having an elliptical cross section. The elliptical cross section may twist along the length of the hole.

The apparatus of the invention includes a longitudinal housing adapted to fit inside the borehole. The housing includes a first end portion, a second end portion, and a side portion between said end portions, adapted to face the sidewalls of the borehole. Furthermore the apparatus includes means on the side of the housing for removing material from said borehole sidewall. The apparatus can be rotated and moved in a lengthwise direction on for instance a drill string or includes separate means for rotating the housing with a controlled rotational speed in relation to said the borehole sidewalls. The apparatus may include means for feeding the housing in a controlled rate of longitudinal motion in relation to said borehole.

The means for removing material may include particle blasting nozzles, but this method may be less favourable and cannot really be compared to a milling method.

The housing may include energized driving means, such as mud motors and other driving elements well known within the field, typically driven by drilling mud, or electrically with electric motors. The means for removing material from said borehole wall in the side of said housing may include at least one mill driven in rotation by said driving means.

The mill or bits may typically have a dome shaped head with sintered or some kind of hard facing bits to provide a milling action. However other shapes such as a pointed or square shape may be used. Synthetic diamonds will typically be used on the face of the mill.

Said means for rotating the housing with a controlled rotational speed may includes means for rotating a drill string attached at a rearward end of said housing. Typically the rotation is provided by ordinary means for rotating a drill string.

The at least one mill for removing material may be inclined in relation to the borehole wall for providing both a forward motion and a rotating motion of the housing in the borehole while milling a helical rifle.

The housing may include a first and a second part, and at least the first part may include means such as a drill bit for removing material from in front of said borehole to further drill the hole. The second part may be glidingly attached to the first part. One or both parts may include means for anchoring the apparatus to the borehole wall. The parts may then be driven back and forth by a suitable actuator to provide a mechanism for providing a simultaneous rotating and forward motion resulting in an inchworm motion. The means for anchoring the apparatus to the borehole wall must then grip or release the borehole wall sequentially to provide the twisting inchworm motion. The housing must furthermore include means for removing material from the borehole wall as explained.

The housing may further include a drill bit at the end of the housing facing in the direction of the borehole for drilling the borehole. The drill bit may be an ordinary drill bit well known within the field, and may typically be driven by a mud motor.

The housing may include several mills on the side of said housing. Four mills may for instance be used.

When a main borehole is penetrated may additional grooves along the axis of the borehole introduce a bigger effective cross sectional area with constant effective diameter, and there by maintaining the buckling capacity of the drill string. The number of grooves may be varied from 1 to 4 or more. The number, shape and size may vary with tool design. The amount of reduction of wall contact is also dependent on number and size of the side mills or cutters and could even be more than 95%. The modified borehole of the invention can be applied to all borehole or well sizes. In general, every non-circular and out of shape cross section that has been rotated along the bore hole axis will create spiral grooves, corners and shapes (rifled well) and gives the benefit of maintaining eg. a drill string inside the main borehole.

The apparatus may further include sensors for monitoring rotation and forward motion in relation to the borehole. Output from the sensors may be fed in real time to the surface for controlling forward motion and rotation of the apparatus or may be fed to a control system on the apparatus. The sensors may also provide information to onboard computer readable storage means for later reading by a computer after the apparatus is retrieved to the surface.

The housing may include at least one actuator for actuating the at least one mill between an extended operating position and a retracted position, in particular to be able to retract the mill or mills during running in or retrieval. The housing may also include redundant mills for operation if some mills should fail.

Furthermore the invention relates to a borehole for the exploration and production of hydrocarbons with a bore with a substantially circular cross section and a helical rifle surrounding the bore. The shape of the helical rifle will typically conform to the shape of the mill used to make the rifle, typically providing a curved or pointed section. If the less favourable method of abrasive blasting is used, the profile or section will be less predictable and will to a greater extent depend on the material in the borehole. The shape is however of less importance as long as the helical or spiral rifle provides the intended effect. The invention may also include a swivel for allowing the apparatus to rotate freely or for providing an independent rotation of the apparatus in relation to the drill string.

The invention may also include a reamer. Means for centring the apparatus in the borehole may also be provided.

In a further aspect, the invention provides an apparatus for drilling a borehole having a cross section varying along its length in relation to a fixed axis parallel to the bore hole. Said borehole cross sections may have at least one of a multi profile pattern, an elliptical pattern having spiral grooves along a main borehole axis, and a multi diameter borehole.

In a further aspect, the invention provides a borehole having a multi profile or elliptical cross section formed by the use of a bottom-hole-assembly comprising a milling process.

In a further aspect, the invention provides a tube for transporting liquids with a substantially non-circular cross section which is twisted along the axial length and results in rifle shaped grooves in the tube.

Furthermore, the invention relates to a method for making a borehole with internal, helical grooves. The method comprises the steps of installing an apparatus as defined above and with a longitudinal housing in a borehole. The housing includes a first end portion, a second end portion, and a side portion between said end portions. The means or mills on said side portion for modifying the bore hole wall is then operated for removing material. The housing is rotated and fed in a controlled rate of longitudinal motion and with a controlled rotational speed in relation to said the borehole walls.

The apparatus of the invention may rotate without any forward motion to produce areas of different diameter. The mills may then be retracted, the apparatus led forward and then the milling of an area of different diameter may commence by rotation of the apparatus without forward motion. The width of the area with different diameter can be controlled by the rotation and the forward motion.

In a further aspect, the invention provides a method for drilling a borehole having a cross section varying along the length of the borehole, according to one of the borehole cross section embodiment provided above.

BRIEF DESCRIPTION OF DRAWINGS

Example embodiments of the invention will be described in relation to the following drawings, in which.

DETAILED DESCRIPTION OF THE DISCLOSURE

Figure 1:
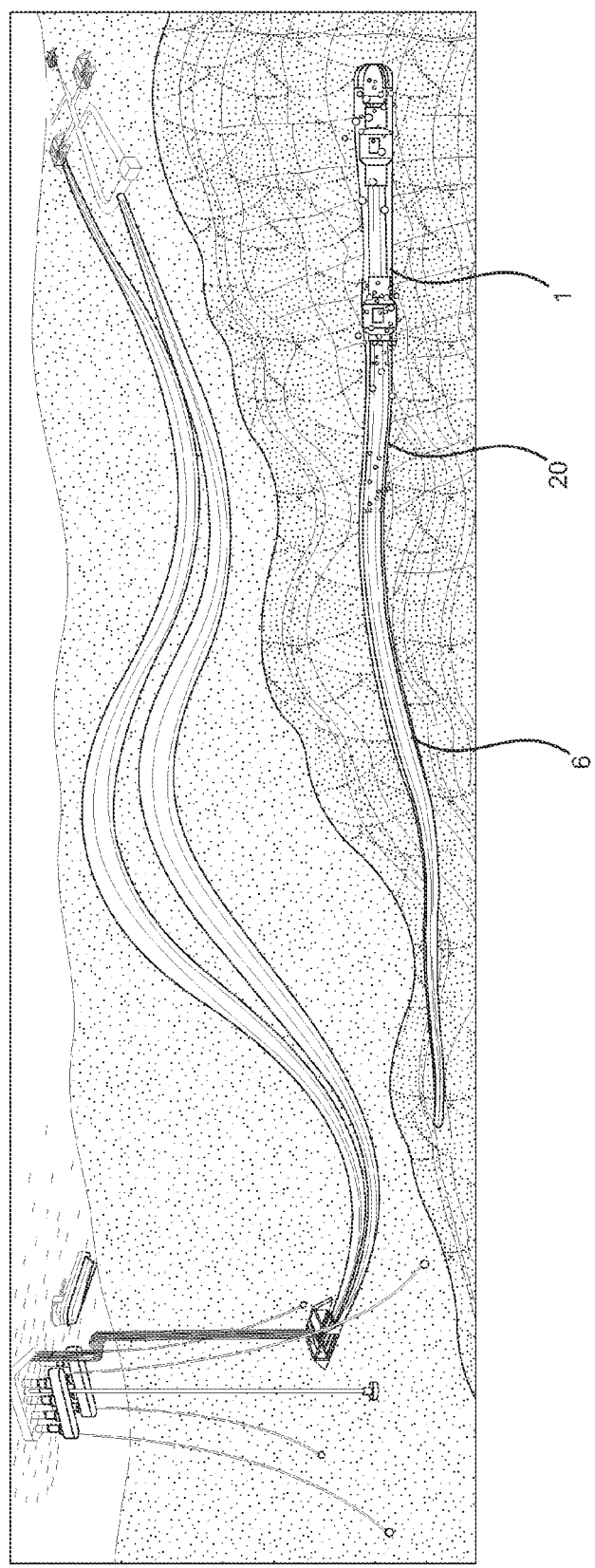
FIG. 1 is an example of the present invention used for Extended Reach Drilling (ERD)

In the following, the invention will be better explained with reference to the accompanied figures:

FIG. 1 shows an apparatus 1 according to the invention for Extended Reach Drilling (ERD) from a subsea installation, in a borehole 20. The apparatus is attached to a drill string 6.

Figure 2:
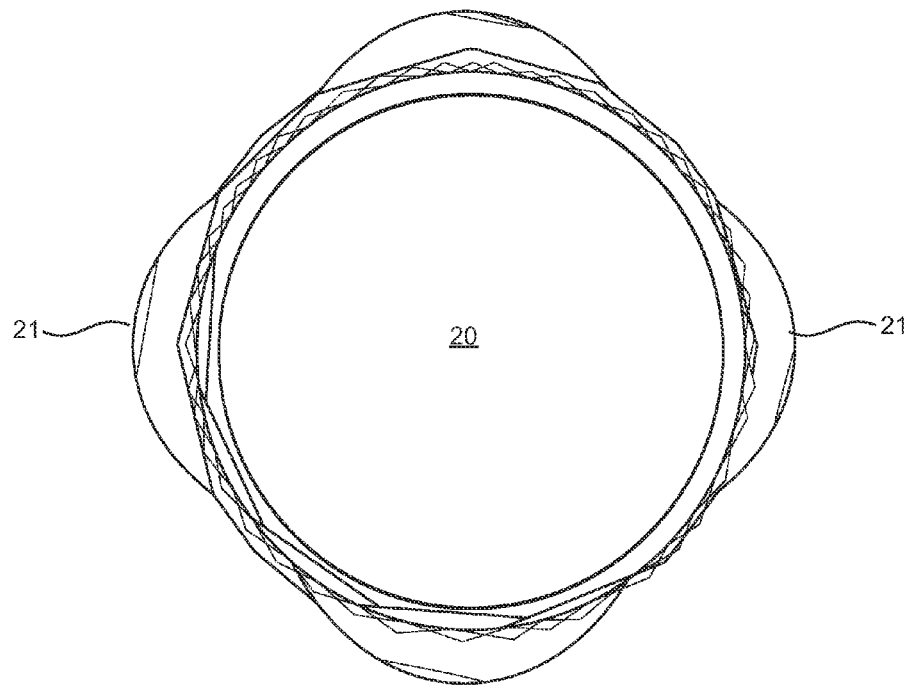
FIG. 2 shows a cross section of a borehole with a multi spiral rifle shape according to an embodiment of the invention.

FIG. 2 shows an example of a cross section of a borehole 20 according to the invention, drilled with an apparatus that will be further elaborated below. The borehole include rifles or longitudinally extending grooves 21 that typically will form a rotating pattern around the bore hole 20. The shape of the rifles may be rounded as shown on the figure.

Figure 3:
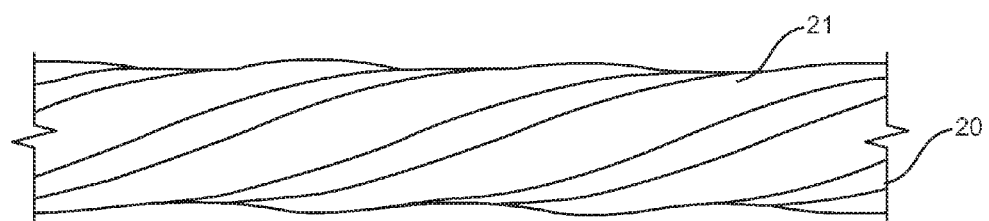
FIG. 3 is an illustration from the side of the multi spiral rifle shaped borehole of FIG. 2.

FIG. 3 is a side view of the borehole 20 of FIG. 2, where the helical grooves or rifles 21 are shown as stripes to better illustrate the shape of the borehole.

Figure 4:
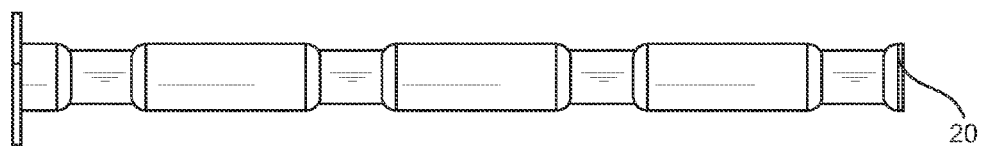
FIG. 4 is an illustration from the side of a multi diameter borehole according to an embodiment of the invention.

FIG. 4 is an illustration from the side of a multi diameter borehole 20 according to an embodiment of the invention. The figure shows how a borehole can be made with several diameters, indicated with black and white areas, the black areas indicating a modified hole with increased diameter.

Figure 5:
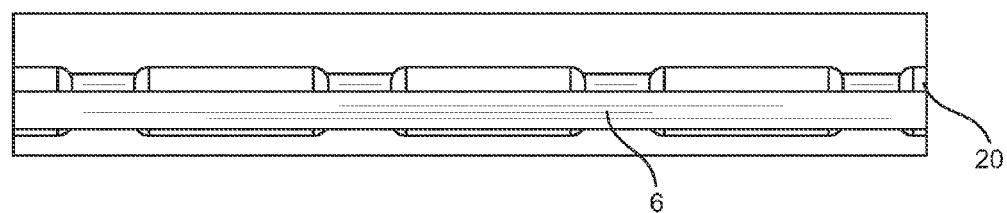
FIG. 5 is an illustration from the side of a multi diameter borehole according to an embodiment of the invention, with a drill string in the hole.

FIG. 5 is an illustration from the side of a multi diameter borehole 20 of FIG. 4 with a drill string 6 in the hole. The figure shows how the contact area between the drill string 6 and the wall of the borehole 20 is reduced compared to a hole with substantially uniform diameter along the length.

Figure 6:
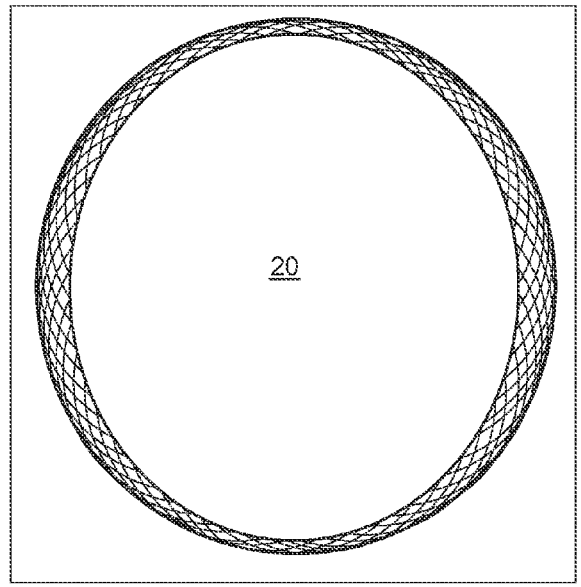
FIG. 6 shows a cross section of an elliptical borehole.
Figure 7:
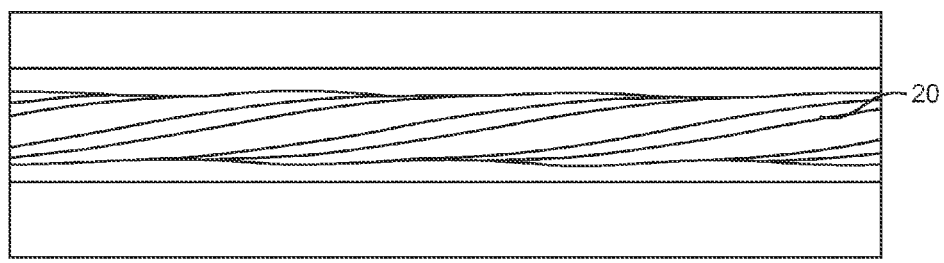
FIG. 7 is an illustration from the side of the elliptical rifle shaped borehole of FIG. 6.

FIG. 6 is an illustration of a different embodiment of the invention from the side with an elliptical, rifle shaped borehole. The elliptical shape can be rotated along the length of the borehole 20 as illustrated on FIG. 7. FIG. 7 shows the elliptical spiral as different shading.

Figure 8:
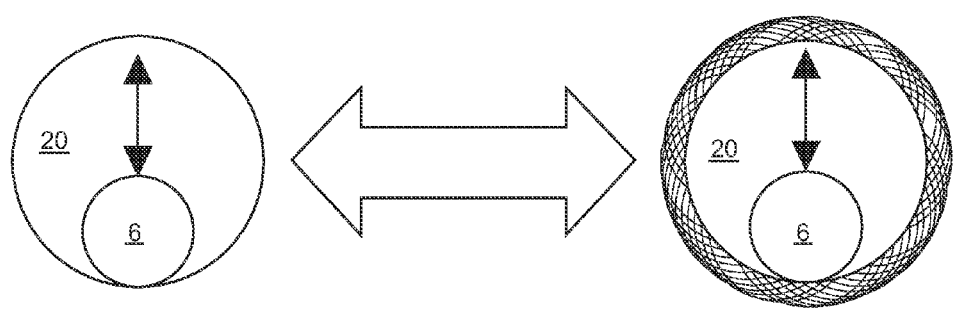
FIG. 8 shows a cross section of a borehole with a drill string before and after modification of the borehole sidewalls.

FIG. 8 shows a cross section of a borehole with a drill string before and after modification of the borehole sidewalls, where the drill string 6 is shown in an ordinary borehole 20 to the left and in a borehole 20 with rifles according to the invention to the right. The illustration shows how the contact area between the drill string and the borehole is reduced, and how the effective cross section for transportation of fluids is increased. Furthermore the problem related to differential sticking is reduced. Rotating the position of the grooves along the axis of the bore hole and introducing the spiral grooves contributes to maintain a mechanical clearance between the drill string and borehole.

Figure 9:
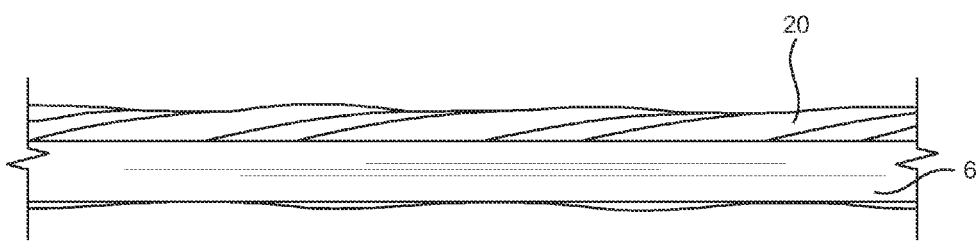
FIG. 9 is an illustration from the side of a multi spiral rifle shaped borehole according to an embodiment of the invention, with a drill string in the hole, showing contact points between the borehole and the drill string.

FIG. 9 is an illustration from the side of a multi spiral, rifle shaped borehole 20 according to an embodiment of the invention, with a drill string 6 in the hole 20, showing contact points between the borehole and the drill string 6. The rifles are shown as black areas.

Figure 10:
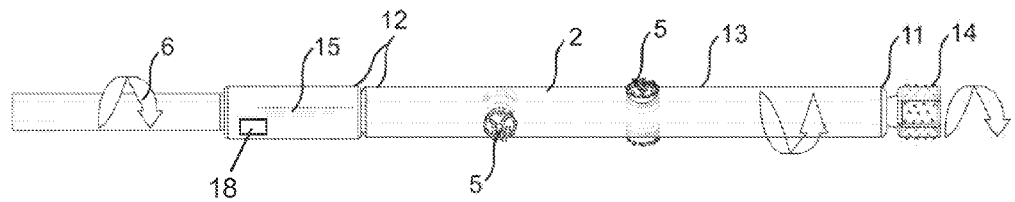
FIG. 10 shows a first embodiment of an apparatus according to the invention from the side.

FIG. 10 shows a first embodiment of an apparatus 1 for modification of the sidewalls of a borehole according to the invention, from the side. Modification in this context is intended to cover removing material from the sidewalls to provide grooves, rifles, recesses, different diameters etc. The apparatus 1 includes a longitudinal housing 2 adapted to fit inside the borehole. The housing 2 is typically cylindrical or tubular and includes a first end portion 11 and a second end portion 12. A side portion 13 extends between the end portions 11 and 12. The side portion 13 is adapted to face the sidewalls of the borehole. FIG. 10 shows three means 5 on the side of the housing 2 for removing material from the borehole wall. A fourth means 5 is not shown on the figure as it is hidden behind the housing 2. A drill bit 14 is located at the first end portion 11 of the housing 2. The drill bit 14 will typically be driven in fast rotation by a mud motor or any other suitable motor, typically inside the housing 2. If the apparatus 1 of the invention is to be used in an all ready drilled borehole, then the drill bit 14 can be omitted. A swivel 15 controls the rotation of the housing 2 in relation to a drill string 6. The swivel 15 is attached to the housing 2 at the second end portion 12. The swivel 15 may allow free rotation of the drill string in relation to the housing.

The housing 2 may be rotated in relation to the borehole by with a controlled rotational speed in relation to the borehole sidewalls and may include separate anchoring means 18 on the swivel 15 and an actuator in the swivel 15 or the housing 2 for providing rotation of the housing 2. Alternatively the means for removing material 5 may include rotating mills that can be attached inclined in relation to the housing 2 to provide a rotating action on the housing 2. The drill bit 14 will also result in an applied torque on the housing that again can be used to rotate the housing 2 in relation to the borehole. This embodiment provides an opportunity for slow rotation of the drill string and reduced wear in ERD wells. As mentioned, the apparatus can be automatically rotated by the torque imposed by the drill bit 14, and the pitch of the rifles or helical grooves is created automatically. The tools can be located in upper part of a BHA behind the main drill bit and LWD and MWD tools. The bits or mills 5 of the apparatus 1 can rotate and penetrate in to the borehole wall perpendicular to the borehole axis and the main drilling bit 14. The side drill bits are rotating and have the capability to move out of the body and retract after finishing the job. In order to make the spiral grooves apparatus may rotate slowly during the axial penetration of the main borehole. The main drilling bit and the side bits are rotating fast but the body of the Apparatus must been rotated slowly to create the spiral pitch. The pitch of the spirals is depending to the rate of penetration of main bit and the rate of rotation of the apparatus. This process can be designed manual or automatic.

According to the different design of the apparatus 1, the main drill bit 14 in front of the drill string 6 and the sides drill bits 5 can rotate by using internal mud motors. In this case the pitch of the spirals controlled by slow rotation of the drill string.

The apparatus can be designed to work on a rotary drill string and in this case the main drill bit 14 and the side bits 5 will rotate by rotating of the drill string. The reactive torque of the main drill bit will cause to slow rotating of the Apparatus and creating the spiral grooves. The pitch of the spirals will create automatically and are according to the tool design. Releasing the BHA included the apparatus from the drill string and have a free rotational drill string which might be beneficial to reduce the casing wear in a ERD well.

Figure 11:
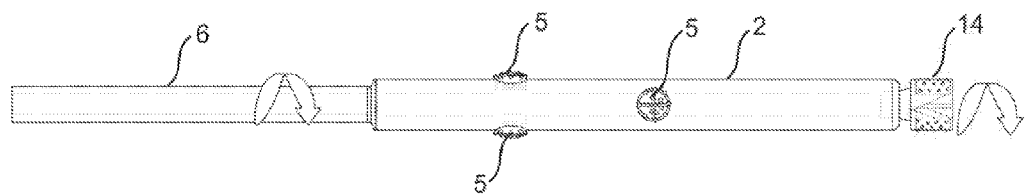
FIG. 11 shows a second embodiment of an apparatus according to the invention from the side.

FIG. 11 shows a second embodiment of an apparatus according to the invention from the side. In this embodiment the swivel 15 on FIG. 10 is omitted. In this embodiment, the drill string 6 is rotated along with the housing 2 to rotate the mills 5 in relation to the borehole. A drill bit 14 is attached to the housing 2. The drill string 6 may also slide, and the sliding and rotating action of the drill string will control pitch on the rifles in the borehole. The pitch can the typically be controlled from the surface. The bit 15 can be rotated with a Positive Displacement Motor (PDM). Alternatively, with a rotating drill string 6, the pitch of the rifles is created automatically. The bit 14 may be rotated by the drill string.

Figure 12:
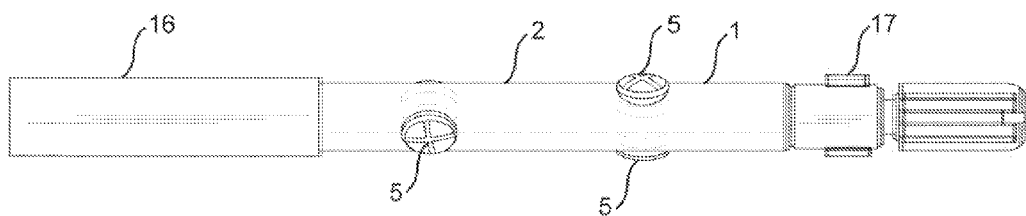
FIG. 12 shows a third embodiment of an apparatus according to the invention from the side.

FIG. 12 shows yet another embodiment of an apparatus according to the invention. In this embodiment, the tool is made as a retrievable part of a bottom hole assembly (BHA) that can be used as an after a reaming tool 17 or casing and liner drilling. The apparatus can then be fixed to a liner 16, and slow rotation of the liner and the apparatus 1 with housing 2, for instance 10 rpm, can ream the borehole to expand the borehole. In this configuration, less torque for rotating the apparatus is required for reaming the hole. Rotating side bits 5 on the apparatus may lead to a more effective cutting process compared to passive cutter elements on traditional reamers. Forming grooves according to the invention may also improve the mechanical conditions during liner and casing drilling.

In the apparatus according to the invention, the mills 5 may be extended or retracted from the housing 2 by suitable actuators, or may be fixed.

Various motors or actuators may be used for driving the mills and the drill bit. Motors may typically include mud motors or electric motors. An umbilical cord providing signals and power to the apparatus may typically be used in place of a drill string, casing or liner.

Figure 13:
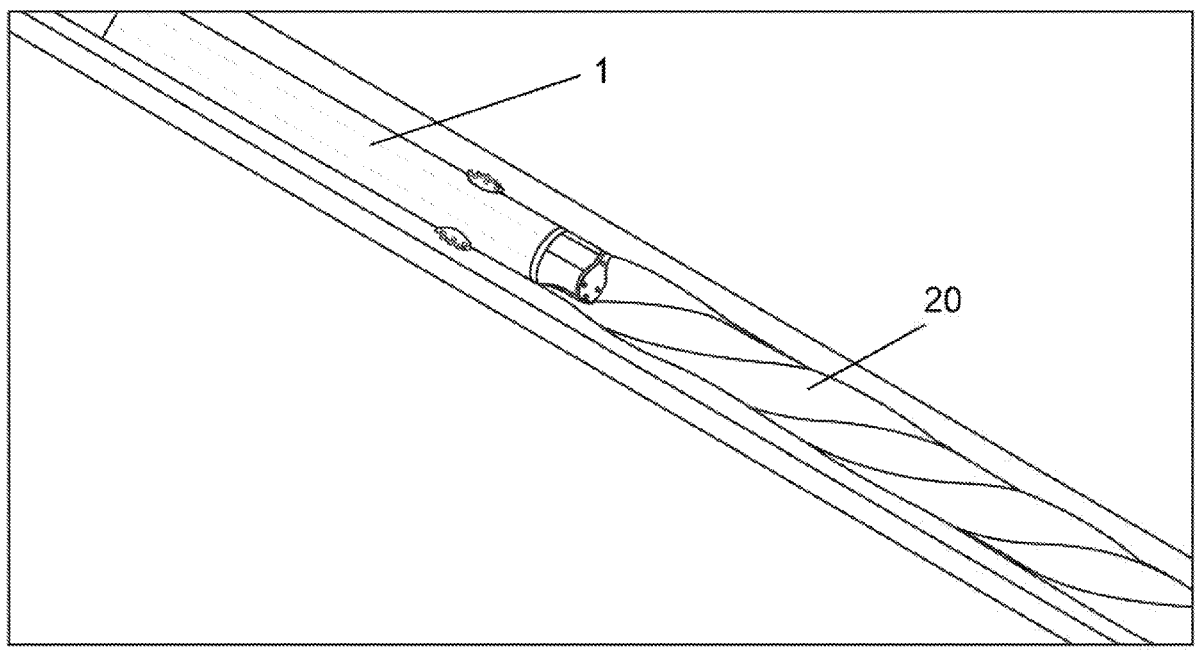
FIG. 13 shows an apparatus according to the invention in a borehole.

FIG. 13 shows an apparatus 1 according to the invention in a borehole 20. Black and white spirals indicate the spiral shaped grooves in the borehole.

Table 1 shows typical calculations and parameters for a pipe in a wellbore.

The present invention is particularly developed for use in connection with drilling wellbores for hydrocarbon exploration, but may also be used for instance in connection with installation of pipelines for transporting fluids such as water oil or gas. The invention may actually be used in any bore hole where it is an advantage to reduce the friction between a wall in a hole and a longitudinal object to be pushed or pulled through the hole. The invention may also be used for producing a certain flow pattern in fluid flowing through a borehole.

TABLE 1

| Mud dencity | 1650 | Kg/m^3 | 1650 | 1650 | 1650 | 1650 | 1650 |
|---|---|---|---|---|---|---|---|
| Flow Rate | 0.03 | m 3/S | 0.03 | 0.03 | 0.03 | 0.03 | 0.03 |
| Viscosity pI | 0.015 | Pa · s | 0.015 | 0.015 | 0.015 | 0.015 | 0.015 |
| yield | 2 | Pa | 2 | 2 | 2 | 2 | 2 |
| Boyancy | 0.79 | | 0.79 | 0.79 | 0.79 | 0.79 | 0.79 |
| WOB | 50000 | N | 50000 | 50000 | 50000 | 50000 | 50000 |
| Friction factor | 0.3 | | 0.3 | 0.3 | 0.3 | 0.3 | 0.15 |
| Kick of point | 2979 | meter | 2979.00 | 2979.00 | 2979.00 | 2979.00 | 2979.00 |
| MD | 4000.00 | meter | 3981.68 | 4448.57 | 4298.42 | 4448.57 | 5979.00 |

TABLE 1-continued

| Pipe Diameter (inch) = | | | 3.5 | 4 | | New profiles | | | |
|---|---|---|---|---|---|---|---|---|---|
| Hole diameter | 0.149225 | meter | 0.1492 | 0.1492 | Virtual | 0.1560 | Virtual | 0.1558 Virtual | 0.1700 |
| Tubing ID | 0.157 | meter | 0.157 | 0.157 | D = | 0.157 | D = | 0.157 D = | 0.157 |
| ID Scsssv | 0.149225 | meter | 0.15 | 0.15 | | 0.15 | | 0.15 | 0.15 |
| BHA OD | 4.75 | inch | 0.1207 | 0.1207 | | 0.1207 | | 0.1207 | 0.1207 |
| BHA L | 53 | meter | 53.00 | 53.00 | | 53.00 | | 53.00 | 53.00 |
| Pip OD (S-135) | 3.5 | inch | 0.0889 | 0.1016 | | 0.1016 | | 0.1016 | 0.1016 |
| Weight | 15.5 | lb/ft | 226.76 | 241.39 | | 241.39 | | 241.39 | 241.39 |
| Pipe ID | 2.6 | inch | 0.0660 | 0.0848 | | 0.0848 | | 0.0848 | 0.0848 |
| Free hole Area | 174.80 | cm^2 | | | | | | | |
| Deviation | 90 | degree | 90.00 | 90.00 | | 90.00 | | 90.00 | 90.00 |
| K(stifness matrix) | 2.82 | | 2.82 | 2.82 | | 2.82 | | 2.82 | 2.82 |
| Elastic Modul | 2.10E+11 | N/m^2 | 2.10E+11 | 2.10E+11 | | 2.10E+11 | | 2.10E+11 | 2.10E+11 |
| I | | m^4 | 2.13E−06 | 2.69E−06 | | 2.69E−06 | | 2.69E−06 | 2.69E−06 |
| A1 = Annulus pipe-tubing | | m^2 | 0.01315 | 0.01125 | | 0.01125 | | 0.01125 | 0.01125 |
| A2 = Annulus pipe-open hole | | m^2 | 0.01128 | 0.00938 | | 0.01099 | | 0.01096 | 0.01460 |
| A3 = Annulus BHA-open hole | | m^2 | 0.00605 | 0.00605 | | 0.00767 | | 0.00763 | 0.01127 |
| Flow speed A1 | | m/s | 2.28216 | 2.66755 | | 2.66755 | | 2.66755 | 2.66755 |
| Flow speed A2 | | m/s | 2.66041 | 3.19923 | | 2.72945 | | 2.73802 | 2.05541 |
| Flow speed A3 | | m/s | 4.95567 | 4.95567 | | 3.91254 | | 3.93018 | 2.66145 |
| Pr loss tubing | (Bingham Laminar) | Bar | 15.80 | 25.09 | | 25.09 | | 25.09 | 25.09 |
| Pr loss OH-pipe | (Bingham Laminar) | Bar | 6.74 | 17.96 | | 11.22 | | 12.63 | 14.48 |
| Pr loss OH-BHA | (Bingham Laminar) | Bar | 2.54 | 2.54 | | 1.38 | | 1.39 | 0.54 |
| Bukling | | N | 1.03E+05 | 1.34E+05 | | 1.25E+05 | | 1.34E+05 | 1.34E+05 |
| Reach | | meter | 982.68 | 1469.57 | | 1319.42 | | 1469.57 | 3000.00 |
| Annulus P-Loss | | Bar | 25.09 | 45.59 | | 37.69 | | 39.12 | 40.12 |
| Rate of H-Anis. P-Loss | | Bar/m | 0.0094 | 0.0139 | | 0.0095 | | 0.0095 | 0.0050 |
| | | | | | Dev = | 0.0001 | Dev = | 0.0001 Dev = | −0.0044 |
| | | | | | Area X = | 0.0016 | Area X = | 0.0016 Area X = | 0.0052 |

What is claimed is:

1. An apparatus for modifying sidewalls of a borehole, comprising:
a longitudinal housing configured to fit inside the borehole, wherein the housing has a longitudinal axis, a first end portion, a second end portion, and a side portion extending between said end portions, wherein the side portion is configured to face the sidewalls of the borehole;
a cutting member extending from the side portion of the housing, wherein the cutting member comprises a mill configured to rotate relative to the housing and remove material from said borehole sidewall as the housing advances axially into the borehole, and wherein said housing is configured to be rotated with a controlled rotational speed in relation to said borehole sidewalls and to be axially advanced relative to the borehole at a controlled rate of longitudinal motion; and
an actuator configured to rotate the mill it of the rotation of the housing.

2. The apparatus of claim 1, wherein a drive member is attached at the second end portion end of said housing, wherein the drive member is configured to couple the housing to a drill string and rotate the housing at the controlled rotational speed.

3. The apparatus of claim 1, wherein the mill is inclined in relation to said borehole wall for providing a forward motion and a rotating motion of said housing in said borehole while milling helical rifle grooves.

4. The apparatus of claim 1, wherein said housing includes a first and a second part, wherein at least one of the first and second parts includes:
an anchoring member configured to anchor the apparatus to the borehole wall; and
an actuator configured to provide a simultaneous rotating and forward motion between the first and second part in an inchworm motion.

5. The apparatus of claim 1, wherein the cutting member comprises a plurality of mills extending from the side portion of the housing.

6. The apparatus of claim 1, further comprising a control system configured to monitor the rotation and forward motion of the housing in relation to the borehole sidewall to provide a helical rifle inside the borehole.

7. The apparatus of claim 1, wherein the housing includes at least one actuator configured to actuate the mill between an extended operating position for contact with said borehole sidewall and a retracted position.

8. The apparatus of claim 1, further comprising a coordinating member configured to coordinate the rotational speed and the rate of forward motion to produce a helical rifle in said borehole.

9. The apparatus of claim 1, wherein said housing is configured to rotate using reactive torque generated when removing material in front of said borehole to remove material from said borehole sidewall.

10. The apparatus of claim 1, wherein the actuator comprises a motor.

11. The apparatus of claim 10, wherein the motor comprises a mud motor or an electric motor.

12. The apparatus of claim 11, wherein the motor is disposed in the housing.

13. A method for making a borehole having a sidewall with internal, helical grooves, comprising:
- installing an apparatus with a longitudinal housing adapted to fit inside the borehole, said housing includes a first end portion, a second end portion, and a side portion extending between said end portions;
- rotating a cutting member extending from the side portion of the housing relative to the housing to remove material from said borehole sidewall as the housing advances into the borehole;
- rotating the housing with a controlled rotational speed in relation to said the borehole sidewalls; and
- feeding the housing in a controlled rate of longitudinal motion in relation to said borehole.

14. Use of an apparatus according to claim 4 for drilling a well for producing hydrocarbons.

\* \* \* \* \*